United States Patent
Takahashi et al.

(10) Patent No.: US 8,803,510 B2
(45) Date of Patent: Aug. 12, 2014

(54) ROTATION DETECTING DEVICE AND BEARING HAVING ROTATION DETECTING DEVICE

(75) Inventors: Toru Takahashi, Iwata (JP); Pascal Desbiolles, Thorens-Glières (FR)

(73) Assignees: NTN Corporation, Osaka (JP); NTN-SNR Roulements, Annecy (FR)

( * ) Notice: Subject to any disclaimer, the term of this patent is extended or adjusted under 35 U.S.C. 154(b) by 435 days.

(21) Appl. No.: 12/998,963

(22) PCT Filed: Dec. 22, 2009

(86) PCT No.: PCT/JP2009/007100
§ 371 (c)(1),
(2), (4) Date: Sep. 2, 2011

(87) PCT Pub. No.: WO2010/073607
PCT Pub. Date: Jul. 1, 2010

(65) Prior Publication Data
US 2011/0309824 A1    Dec. 22, 2011

(30) Foreign Application Priority Data

Dec. 24, 2008  (JP) ................................. 2008-327467
Nov. 30, 2009  (JP) ................................. 2009-271042

(51) Int. Cl.
*G01B 7/30*    (2006.01)
(52) U.S. Cl.
USPC ................. 324/207.13; 324/207.25
(58) Field of Classification Search
USPC .............. 324/207.25–207.26, 207.13–207.25
See application file for complete search history.

(56) References Cited

U.S. PATENT DOCUMENTS 6,384,752 B1 *  5/2002  Suzuki et al. ................. 341/111
6,700,367 B1    3/2004  Santos et al.
(Continued)

FOREIGN PATENT DOCUMENTS

JP    2002-541485    12/2002
JP    2006-322927    11/2006
(Continued)

OTHER PUBLICATIONS

English Translation of the International Preliminary Report on Patentability mailed Aug. 18, 2011 in corresponding International Patent Application PCT/JP2009/007100.
(Continued)

*Primary Examiner* — Arleen M Vazquez
*Assistant Examiner* — Brent J Andrews

(57) ABSTRACT

Provided are a rotation detecting device that highly precisely detects absolute angle with low noise, as well as a bearing assembly with such a rotation detecting device. Such a rotation detecting device includes magnetic encoders arranged coaxially with different number of magnetic poles as well as magnetic sensors that detect magnetic fields of those encoders. Each of the magnetic sensors can detect the encoders within each magnetic pole, and includes sensor elements as well as a phase detector that determines the phase of the sensor element in reference to a detected magnetic field signal and then outputs an ABZ phase signal. Such a rotation detecting device further includes a phase difference detector that determines a phase difference of the magnetic field signals in reference to an output from the phase detectors and an angle calculator that calculates the absolute angle of the encoders based on the detected phase difference.

13 Claims, 10 Drawing Sheets

(56) References Cited

U.S. PATENT DOCUMENTS

| | | |
|---|---|---|
| 7,385,389 B2 | 6/2008 | Tahara et al. |
| 7,923,993 B2 | 4/2011 | Takahashi et al. |
| 2003/0173956 A1* | 9/2003 | Fujikawa et al. ........ 324/207.22 |
| 2003/0192386 A1* | 10/2003 | Tokumoto et al. ....... 73/862.334 |
| 2006/0250128 A1* | 11/2006 | Tahara et al. ............ 324/207.25 |
| 2008/0174305 A1* | 7/2008 | Koike et al. .............. 324/207.25 |
| 2009/0315544 A1 | 12/2009 | Takahashi et al. |
| 2010/0001717 A1 | 1/2010 | Tomioka |
| 2010/0066352 A1 | 3/2010 | Takahashi |

FOREIGN PATENT DOCUMENTS

| | | |
|---|---|---|
| JP | 2008-039744 | 2/2008 |
| JP | 2008-116291 | 5/2008 |
| JP | 2008-233069 | 10/2008 |

OTHER PUBLICATIONS

International Search Report for PCT/JP2009/007100, Mailed Feb. 2, 2010.

* cited by examiner

Fig. 3
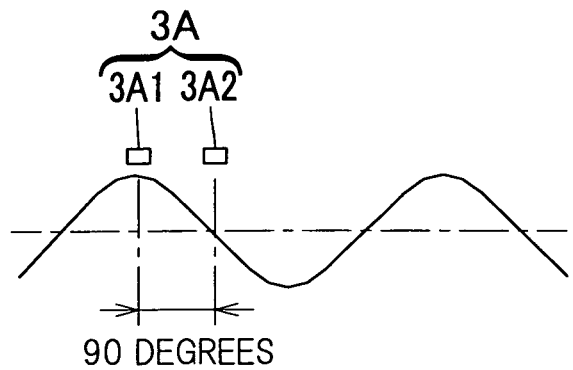
90 DEGREES
Fig. 4A
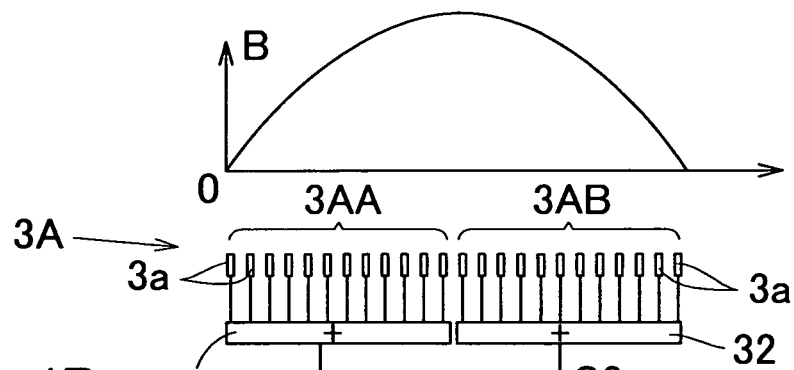
Fig. 4B
Fig. 4C
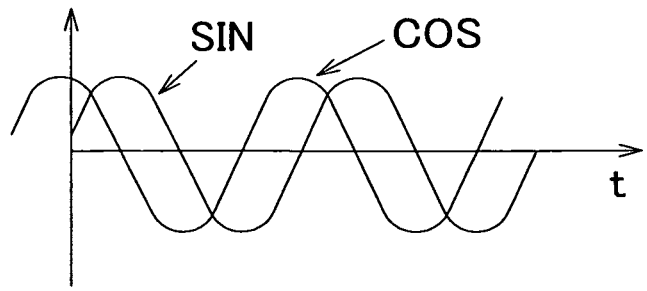

ROTATION DETECTING DEVICE AND BEARING HAVING ROTATION DETECTING DEVICE

CROSS REFERENCE TO RELATED APPLICATIONS

This application is a national phase application, under 35 U.S.C. 371, of international application No. PCT/JP2009/007100, filed on Dec. 22, 2009, which claimed priority to Japanese Patent Application Nos. 2008-327467, filed on Dec. 24, 2008 and 2009-271042, filed on Nov. 30, 2009, the disclosures of which are incorporated herein by reference.

FIELD OF THE INVENTION

The present invention relates to a rotation detecting device that is used in detection of a rotational angle in various types of machines and equipments, particularly in detection of the rotational angle for the control of rotation of various motors, and a bearing assembly having such rotation detecting device mounted thereon.

BACKGROUND ART

As a rotation detecting device of this kind, the rotation detecting device is known, which utilizes a winding stator and a rotor and in which a plurality of tracks having different numbers of poles are formed in the rotor to thereby form an absolute encoder so that the absolute angle can be detected in reference to the phase difference in signals detected from those tracks. (See, for example, Patent Document 1 listed below.)

As another rotation detecting device, that obtains two phase magnetic field signals has been suggested. (See, for example, Patent Document 2 listed below.) This is provided with a magnetic pulse generating means of a ring shape such as, for example, a magnetic encoder, in which magnetic pole pairs are arranged in a circumferential direction, for generating magnetic pulses, and a plurality of detecting elements arranged in a circumferential direction relative to this magnetic pulse generating means for detecting the magnetic pulses, the absolute angle being detected by calculating respective output signals of the detecting elements.

Also, as a further rotation detecting device, there has been suggested a device in which a mode for outputting the absolute angle is executed by the utilization of the ABZ phase signal. (See, for example, Patent Document 3 listed below.)

As a still further rotation detecting device, there has been suggested a device, which utilizes a plurality of rows of magnetic encoders, of which numbers of poles are different from each other, and in which by the utilization of a plurality of magnetic sensors capable of detecting the respective magnetic fields of those magnetic encoders, the absolute angle can be calculated in reference to the phase difference between the magnetic signals detected by those magnetic sensors. (See, for example, Patent Documents 4 listed below.)

[Patent Document 1] JP Laid-open Patent Publication No. 2006-322927
[Patent Document 2] JP Published Int'l Application No. 2002-541485
[Patent Document 3] JP Laid-open Patent Publication No. 2008-116291
[Patent Document 4] JP Laid-open Patent Publication No. 2008-233069

SUMMARY OF THE INVENTION

It has however been found that any of those suggested examples is not satisfactory all at a time with respect to features of being robust against noise and of having a capability of detecting the absolute angle with high precision even during a high speed rotation.

The Patent Document 4 is silent as to the signal morphs required to transmit the various magnetic phase signals to a phase difference detecting circuit in the construction designed to calculate the absolute angle from the magnetic phases detected by the plural magnetic sensors. In particular, in the case where the plural magnetic sensors are mounted as separate elements, in order to achieve the highly precise absolute angle detection, it is necessary in detecting the absolute angle to accurately transmit the phase of the magnetic signals detected with the use of a minimized number of wirings and without being disturbed by noises. The Patent Document 4 is silent as to the signal morphs required to transmit the various magnetic phase signals, which have been detected by such plural magnetic sensors, to the phase difference detecting circuit.

Although it is possible to employ a serial communication method in the transmission of the phase of the magnetic signal, since the serial communication requires a substantial amount of time in transmitting data, there is a problem in that a delay tends to occur, accompanied by worsening of the detection precision during the high speed rotation.

An object of the present invention is to provide a rotation detecting device robust against noise and capable of detecting the absolute angle with high precision even during a high speed rotation and a bearing assembly having this rotation detecting device mounted thereon.

A rotation detecting device is provided which includes: a plurality of magnetic encoders arranged in a coaxial ring arrangement and having respective number of magnetic poles different from each other; and a plurality of magnetic sensors for detecting respective magnetic fields of those magnetic encoders, each of the magnetic sensors having a function of detecting information on the position of the magnetic encoders within each of the magnetic poles. Each of the magnetic sensors includes a plurality of sensor elements, and a phase detector for determining the phase of the sensor element in reference to a magnetic field signal detected thereby and outputting an ABZ phase signal including A-phase and B-phase pulse signals A and B, which are displaced 90° in phase from each other, and a Z-phase pulse signal Z indicative of start position. Such a rotation detecting device further includes: a phase difference detector for determining a phase difference of the magnetic field signals in reference to an output from the phase detectors; and an angle calculator for calculating the absolute angle of the magnetic encoders based on the phase difference so detected. The plural magnetic sensors referred to above may be mounted on a wiring substrate or any other components as elements separate from each other and may be connected with the phase difference detector through wirings on the wiring substrate, or independent wirings.

According to the above construction, the phase of the magnetic field signal detected by each of the magnetic sensors is transmitted to the phase difference detector in the form of the ABZ phase signal, not as an analog signal. For this reason, a high speed transmission while being robust against noise can be accomplished and the number of wirings used can be minimized. In particular, where the plural magnetic sensors are surface mounted as separate elements, such advantage that a high speed transmission while being robust against noise is possible can be effectively exhibited in the transmission of the magnetic field signal from the magnetic sensor to the phase difference detector. Also, since unlike the serial communication there is no overhead of the communication protocol, the rotation information can be transmitted in a minimized length of time. As a result, the rotation detecting device robust against noise and capable of detecting the absolute angle with high precision even during a high speed rotation can be obtained.

In the present invention, at least one of the plurality of magnetic encoders having different numbers of magnetic poles may include a plurality of magnetic tracks, with a portion of the magnetic tracks being formed with a phase offset pattern generating an index signal. In this case, the magnetic sensor for the plurality of magnetic tracks detects a phase offset and outputs the index signal as a Z-phase signal. The phase difference detector can reset a counter for counting the A-phase signal and the B-phase signal or set the counter to a prescribed value, upon receiving the index signal. Therefore, even when the counter miscounts due to an influence such as noise, this does not cause a problem once the counter is reset or set to the prescribed value. In this way, retention of error can be avoided.

In the present invention, n number of the phase offset patterns generating the index signal may be formed at substantially equal intervals therebetween so as to output n (n is a natural number) number of Z-phase signals per rotation of the one magnetic encoder, n being a natural integer equal to the difference in number of the magnetic pole pairs between the one magnetic encoder and another one of the magnetic encoders.

Also, each one of magnetic pole pairs of the plurality of magnetic tracks may be formed with the phase offset pattern generating the index signal so as to output a Z-phase signal for each of the magnetic pole pairs. This will provide a configuration equivalent to the one in which the magnetic sensor by itself detects a phase within a magnetic pole and output an ABZ phase signal.

In the present invention, the phase detector may comprise an absolute angle output mode execution section capable of providing an output by selecting one of an absolute angle output mode, in which the phase of the magnetic field signal is outputted as the absolute angle, and a mode in which only the A-phase and B-phase pulse signals A and B are outputted. To render it possible to select one of the modes makes it possible to simplify processing of signals outputted and to provide a diversity of use of output signals.

In the present invention, the rotation detecting device may further comprise an ABZ phase signal output section for outputting at least one set of signals out of the ABZ phase signals outputted by a plurality of the phase difference detector, to the outside of the rotation detecting device.

In the case of this construction, it is possible to detect, for example, the rotational speed by the utilization of the ABZ phase signal outputted by the ABZ phase signal output section to the outside.

In the present invention, the magnetic sensor may comprise a plurality of sensor elements arranged at respective positions displaced from each other within the pitch of the neighboring magnetic poles and capable of obtaining two phase signal outputs representative of sine and cosine curves and of accomplishing detection of the position within the magnetic poles by interpolation between the two phase signal outputs. For example, the number of the plural sensor elements may be two, which are arranged at respective positions displaced 90° from each other in terms of the pitch of the neighboring magnetic poles.

With this construction, a distribution of magnetic fields of the magnetic encoders can be finely detected as an analog voltage signal of a sinusoidal waveform, not an ON/OFF signal, and, accordingly, a highly precise absolute angle detection can be accomplished.

In the present invention, the magnetic sensors may comprise a line sensor, in which sensor elements are lined up along a direction, in which the magnetic poles of the magnetic encoder are arranged, and is capable of detecting the position within the magnetic poles by generating two phase signal outputs representative of sine and cosine curves through calculation and by interpolation between the two phase signal outputs.

Where the sensor elements of the magnetic sensor are constituted by such a line sensor, adverse influences which would be brought about by distortions in the pattern of the magnetic fields and noises can be reduced, making it possible to detect the phase of the magnetic encoders with high precision.

In the present invention, there may be provided an angle information output section for outputting the absolute angle information, calculated by the angle calculator, as the ABZ phase signal. In the case of this construction, there is no need to provide an additional interface for outputting the absolute angle and, therefore, the circuit construction of the rotation detecting device and the circuit construction on the side of a machine where the rotation detecting device is mounted can be simplified.

In the present invention, the magnetic encoder may be either a radial type or an axial type. That is to say, each of the magnetic encoders referred to above may have the magnetic poles on an outer peripheral surface thereof and the sensor elements of the corresponding magnetic sensor confront in a radial direction relative to the magnetic encoder. Also, each of the magnetic encoders referred to above may have the magnetic poles on an axially oriented surface thereof and the sensor elements of the corresponding magnetic sensor confront in an axial direction relative to the magnetic encoder.

A bearing assembly of the present invention may be provided with the rotation detecting device of any one of the constructions described hereinabove mounted on a bearing assembly.

According to this construction, the number of component parts of a bearing, utilizing machine and the number of assembling steps can be reduced and compactization can be achieved.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 3 is a diagram showing a construction example of a magnetic sensor;

FIG. 4 is a diagram showing another construction example of a magnetic sensor;

DESCRIPTION OF THE PREFERRED EMBODIMENTS

Figure 1:
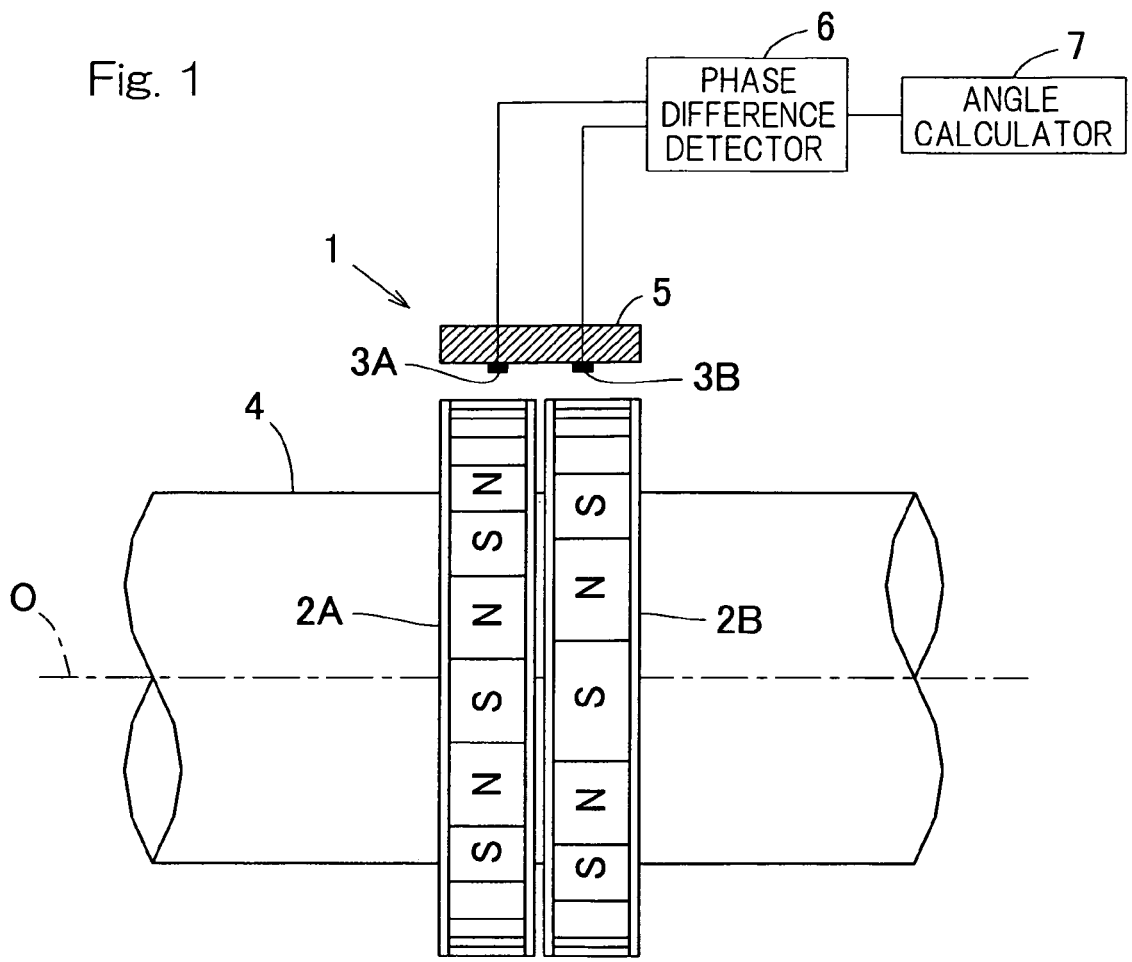
FIG. 1 is a schematic diagram showing a construction example of a rotation detecting device according to a first embodiment of the present invention.

A first embodiment of the present invention will now be described in connection with FIGS. 1 to 13. FIG. 1 illustrates schematically the construction of a rotation detecting device according to this embodiment. The rotation detecting device 1 may include a plurality of magnetic encoders 2A, 2B (two magnetic encoders in the illustrated example) arranged in a coaxial ring arrangement about an axis O of a rotational member 4 such as a rotational shaft of a motor at an outer peripheral thereof. The rotation detecting device may also include a plurality of magnetic sensors 3A, 3B (two magnetic sensors in the illustrated example) that detect respective magnetic fields of the magnetic encoders 2A, 2B. In the illustrated example of FIG. 1, the magnetic sensors 3A, 3B are disposed in or on a stationary member 5 such as a motor housing so as to radially (in a radial direction) confront the corresponding magnetic encoders 2A, 2B with small gaps between them. In the illustrated example, the magnetic sensor 3A confronts the magnetic encoder 2A while the magnetic sensor 3B confronts the magnetic encoder 2B.

The magnetic encoders 2A, 2B are magnetic materials, each substantially in the form of a ring, that are magnetized with a plurality of magnetic pole pairs (a set of S pole and N pole) of a substantially equal pitch in a circumferentially direction thereof. In the illustrated example of FIG. 1, the magnetic encoders 2A, 2B of radial type have an outer peripheral surface magnetized with magnetic pole pairs. The two magnetic encoders 2A, 2B have respective number of magnetic poles different from each other. Although the two magnetic encoders 2A, 2B are arranged axially adjacent each other in the illustrated example, they may be arranged remote from each other in different locations, provided that those magnetic encoders 2A, 2B rotate at the same revolutions.

Figure 2:
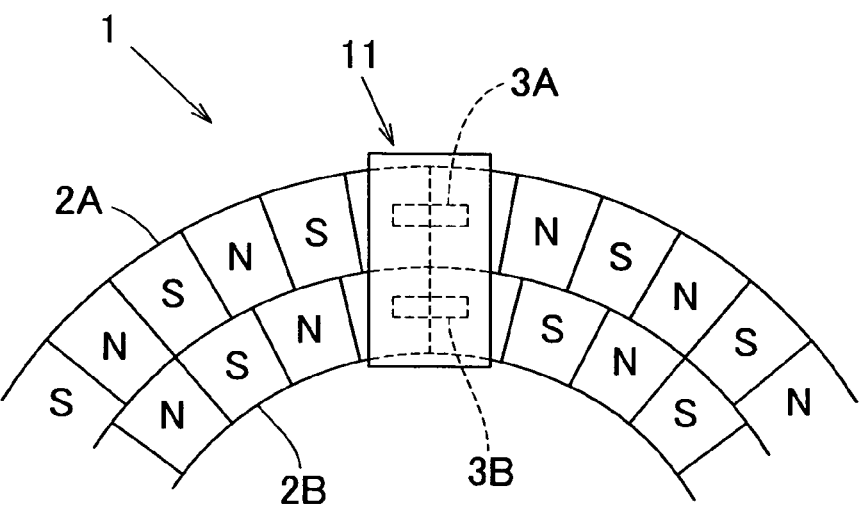
FIG. 2 is a fragmentary side view showing another construction example of a rotation detecting device according to a first embodiment of the present invention.

In an alternative such as shown in FIG. 2, the magnetic encoders 2A, 2B may be of axial type, that is, they may be magnetic materials having axially oriented surfaces formed with a plurality of magnetic pole pairs of a substantially equal pitch arranged in a circumferential direction thereof. In the illustrated example, the two magnetic encoders 2A, 2B are arranged in a coaxial arrangement with respective peripheries adjacent each other. As for magnetic encoders 2A, 2B of axial type, magnetic sensors 3A, 3B are arranged so as to axially confront the respective magnetized surfaces of the corresponding magnetic encoders 2A, 2B.

The plurality of magnetic encoders 2A, 2B, whether they are of radial type or axial type, need not necessarily be arranged adjacent each other. They may be arranged remote from each other, provided that they are able to rotate together.

The magnetic sensors 3A, 3B are each configured to detect magnetic poles with a resolution finer than that which allows the detection of the number of pole pairs of the corresponding magnetic sensors 2A, 2B. In other words, the magnetic sensors 3A, 3B are each configured to have a function of detecting information on the position of the magnetic encoders within each of the magnetic poles of the corresponding magnetic encoders 2A, 2B. To have such a function, for instance, provided that a single pole pair pitch λ of the magnetic encoder 2A corresponds to one cycle, the magnetic sensor 3A may include two sensor elements 3A1, 3A2, such as Hall elements, arranged at respective positions displaced from each other by a phase difference of 90 degrees (λ/4) in a direction in which the magnetic poles are arranged, as shown in FIG. 3. Here, signals of two different phases (sin φ, cos φ) obtained by those two sensor elements 3A1, 3A2 may be multiplied in frequency to calculate the phase within a magnetic pole (the phase φ is equal to $\tan^{-1}(\sin \phi/\cos \phi)$). In other words, the phase within a magnetic pole is calculated by an interpolation process. The same may apply to the other or another magnetic sensor 3B. It is noted that the waveform diagram of FIG. 3 shows the arrangement of the magnetic poles of the magnetic encoder 2A in terms of the magnetic strength.

With this construction of sensor elements of the magnetic sensors 3A, 3B, a distribution of magnetic fields of the magnetic encoders 2A, 2B can be finely detected as an analog voltage signal of a sinusoidal waveform, not as an ON/OFF signal, and, accordingly, a highly precise absolute angle detection can be accomplished.

Other examples of the sensor elements of the magnetic sensors 3A, 3B having a function of detecting information on the position within a magnetic pole of the magnetic encoders 2A, 2B may include a line sensor such as shown in (B) of FIG. 4. In other words, as a way of example, the sensor elements of the magnetic sensor 3A may include a line sensor 3AA, 3BB, in which sensor elements 3a are lined up along a direction in which the magnetic poles of the corresponding magnetic encoder 2A are arranged. It is noted that the waveform diagram (A) of FIG. 4 shows the magnetic strength of a single magnetic pole of the magnetic encoder 2A. Here, as shown in (A) of FIG. 4, the line sensor 3AA of the magnetic sensor 3A is arranged for the 90 degree phase range within the 180 degree phase range, while the line sensor 3AB is arranged for the remaining 90 degree phase range within the same 180 degree phase range. In such an arrangement, the signals detected by the line sensor 3AA are added in a first adder circuit 31 to produce a signal S1, while the signals detected by the line sensor 3AB are added in a second adder circuit 32 to produce a signal S2. The signals S1, S2 are in turn added in an additional adder circuit 33 to provide a sine signal such as shown in (C) of FIG. 4 which is related to the detected magnetic field signal. The signal S2 is inverted in an inverter 35 and added with the signal S1 in a yet additional adder circuit 34 to provide a cosine signal such as shown in (C) of FIG. 4 which is similarly related to the detected magnetic field signal. The position within a magnetic pole may be detected based on these output signals of two different phases so obtained.

Where the sensor elements of the magnetic sensors 3A, 3B are constituted by such a line sensor, adverse influences which would be brought about by distortions in the pattern of the corresponding magnetic fields and noises can be reduced, making it possible to detect the phase of the magnetic encoders 2A, 2B with high precision.

Figure 7:
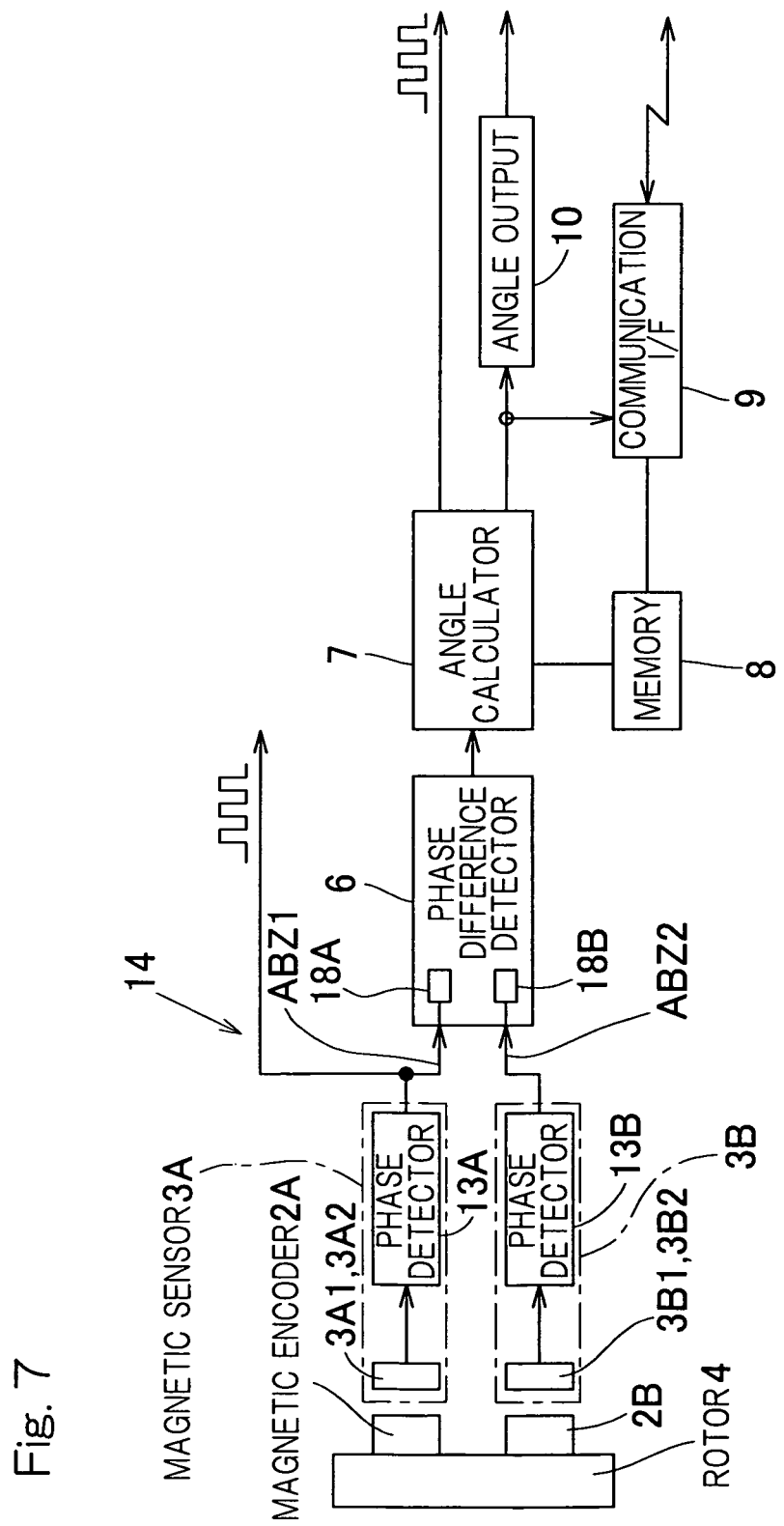
FIG. 7 is a block diagram showing a construction example of an absolute angle detection circuit in a rotation detecting device according to a first embodiment of the present invention.

As shown in FIG. 7, each of the magnetic sensors 3A, 3B may include, in addition to the sensor elements 3A1, 3A2, 3B1, 3B2, a phase detector circuit 13A, 13B that determines the phase of the sensor element in reference to a magnetic field signal detected thereby and outputs the determined phase as an ABZ phase signal. An ABZ phase signal includes A-phase and B-phase pulse signals A and B, which are displaced 90° in phase from each other, and a Z-phase pulse signal Z indicative of start position. For illustration purposes only, in FIG. 7, the sensor elements 3A1, 3A2, 3B1, 3B2 from the construction example of FIG. 3 are shown.

In the illustrated example of FIG. 1, the magnetic sensors 3A, 3B are connected with a phase difference detector 6. The phase difference detector 6 determines a phase difference of the magnetic field signals detected by the magnetic sensors 3A, 3B. The phase difference detector 6 is connected in the subsequent stage with an angle calculator 7 that calculates the absolute angle of the magnetic encoders 2A, 2B based on the phase difference detected by the phase difference detector 6.

The plural magnetic sensors 3A, 3B referred to above may be mounted on a wiring substrate (not shown) or any other components with each sensor packaged individually. The plural sensors 3A, 3B may be connected with the phase difference detector 6 through wirings on the wiring substrate, or independent wirings.

Absolute angle detection by rotation detecting device 1 will now be described in connection with (A) to (E) of FIG. 5 and (A) to (E) of FIG. 6. If the number of the magnetic pole pairs of the magnetic encoders 2B, 2A is P and P+n, respectively, the phase difference between the magnetic encoders 2A and 2B will be n number of the phase for a single magnetic pole pair. Accordingly, the phases of the detection signals from the magnetic sensors 3A, 3B, each corresponding to the magnetic encoders 2A and 2B respectively, coincide with each other at every 360/n degree rotation.

Figure 5:
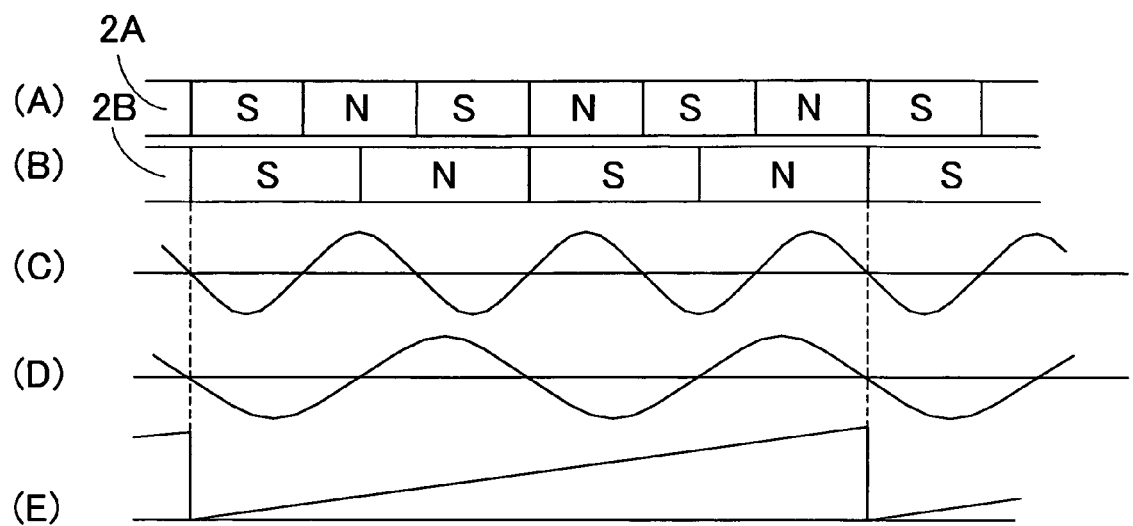
FIG. 5 is a diagram showing the waveform of the detection signals of given magnetic sensors and of the detection signals of a given phase difference detector.

Examples of magnetic pole patterns of the magnetic encoders 2A, 2B are shown in (A) and (B) of FIG. 5, while the waveforms of the detection signals of the magnetic sensors 3A, 3B corresponding to the respective magnetic encoders 2A, 2B are shown in (C) and (D) of FIG. 5. In this example, three pairs of magnetic poles of the magnetic encoder 2A correspond to two pairs of the magnetic poles of the magnetic encoder 2B and the absolute position within the range covered by these magnetic poles can be detected. (E) of FIG. 5 shows the waveform of the output signal of the phase difference determined by such a phase difference detector 6 as shown in FIG. 1, based on the detection signals such as those illustrated in (C) and (D) of FIG. 5.

Figure 6:
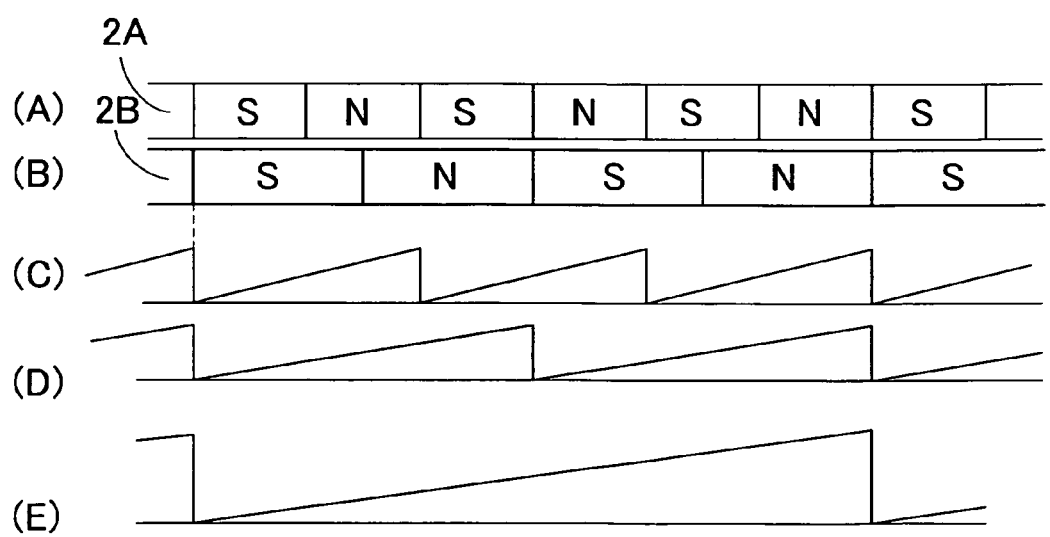
FIG. 6 is a diagram showing the waveform of the respective phases of the detection signals from given magnetic sensors and the phase difference between the detection signals.

(A) to (E) of FIG. 6 are a set of diagrams showing as a way of example the respective phases detected by the magnetic sensors 3A, 3B and the waveforms of the phase difference.

Here, (A) and (B) of FIG. 6 show an example of the magnetic pole patterns of the magnetic encoders 2A, 2B, while (C) and (D) of FIG. 6 show the waveforms of the phases detected by the magnetic sensors 3A, 3B. (E) of FIG. 6 shows the waveform of the phase difference signal which is outputted from the phase difference detector 6.

FIG. 7 shows a construction example of an absolute angle detection circuit in rotation detecting device 1. The phase detector circuits 13A, 13B of the magnetic sensors 3A, 3B output the detected phase signals such as shown in (C) and (D) of FIG. 6, respectively, based on the signals detected by the sensor elements 3A1, 3A2, 3B1, 3B2 such as those shown in (C) and (D) of FIG. 5 for the corresponding magnetic sensors 3A, 3B. In the illustrated example, for illustration purposes, the detected phase signals are shown in the form of sawtooth. However, the phase detector circuits 13A, 13B each output an ABZ phase signal (ABZ1, ABZ2) as a detected phase signal, which will be described later in detail. The phase difference detector 6 outputs a phase difference signal such as shown in (E) of FIG. 6 based on these detected phase signals. An angle calculator 7 at a stage downstream of the phase difference detector 6 performs a conversion from the phase difference determined by the phase difference detector 6 into an absolute angle, using one or more pre-defined calculation parameters. Such one or more calculation parameters used by the angle calculator 7 are stored in a memory 8 such as a non-volatile memory. The memory 8 may store, in addition to such one or more calculation parameters, such information as the number of the magnetic pole pairs of the magnetic encoders 2A, 2B, the reference point for absolute angle, procedures or protocols for outputting signals, etc., which may be necessary for operation of the device. As shown in the illustrated example, a communication interface (I/F) 9 may be provided at a stage downstream of the memory 8 to enable updates in the contents of the memory 8 through the communication interface 9. This allows modifications of individual settings independently of each other. This facilitates the use of the device.

The absolute angle information calculated by the angle calculator 7 may be outputted through an angle information output circuit 10 or through the communication interface (I/F) 9 as a modulated signal, for example, parallel signals, serial data, analog voltages, PWM, etc. Also, a rotational pulse signal may be outputted from the angle calculator 7. The rotational pulse signal may be one of the signals detected by the two magnetic sensors 3A, 3B. As described above, each of the magnetic sensors 3A, 3B may also serve as a multiplier, thus allowing the outputting of a rotation signal with a high resolution.

Figure 8:
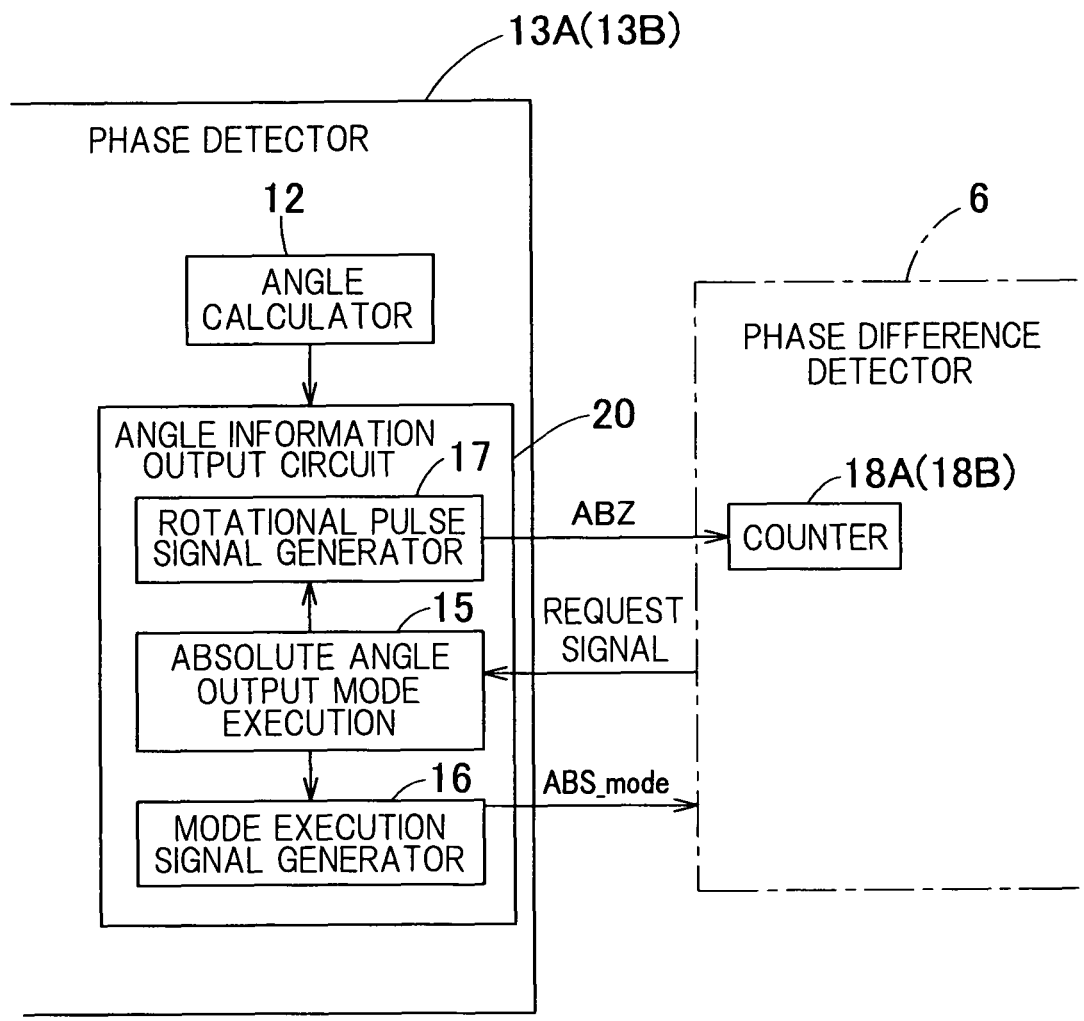
FIG. 8 is a block diagram showing a construction example of an angle information output circuit in a magnetic sensor in a rotation detecting device encompassed in the present invention.

As shown in a block diagram of FIG. 8, each of the phase detector circuits 13A, 13B of the magnetic sensors 3A, 3B may include, in addition to an angle calculator 12 that calculates the phase of the magnetic field detected by the corresponding magnetic sensor, an angle information output circuit 20 that outputs a calculated phase information as an ABZ phase signal and transmits it to the phase difference detector 6.

At least one set of signals out of the ABZ phase signals outputted by the phase difference detecting circuits 13A, 13B of the magnetic sensors 3A, 3B (which, in the illustrated example, is the ABZ phase signal ABZ 1 from the phase detector circuit 13A) may be outputted through the ABZ phase signal output section 14 to the outside of the rotation detecting device. The ABZ phase signal output section 14 may be configured as a circuit that outputs a signal from the output of the phase detector circuit 13A to the outside.

In this way, by outputting an ABZ phase signal through the phase detector circuit 13A to the outside without passing it through the phase difference detector 6 of the subsequent stage, it is possible to utilize the ABZ phase signal directly, for example, for detection of the rotational speed of the rotational member 4.

The angle information output circuit 20 may include a rotational pulse signal generator 17, an absolute angle output mode execution section 15 and a mode execution generator 16.

Figure 9:
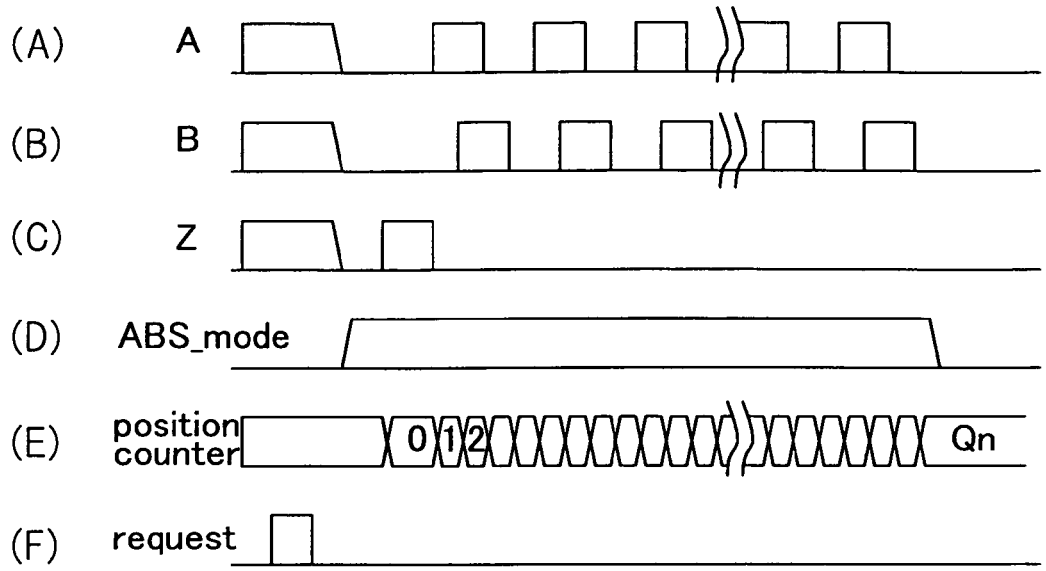
FIG. 9 is a diagram showing the output operation of an angle information output circuit of a given magnetic sensor in an absolute angle output mode, provided that a rotational member is not in rotation.

The rotational pulse signal generator 17 may generate the ABZ phase signal based on the phase of the magnetic field calculated by the angle calculator 12. (A) and (B) of FIG. 9 show the waveforms of two pulse signals (A-phase signal and B-phase signal) that may be generated by the rotational pulse signal generator 17. (C) of FIG. 9 shows the waveform of a Z phase signal that may be generated by the rotational pulse signal generator 17.

The absolute angle output mode execution section 15 may select one of an absolute angle output mode, in which the rotation signals (A-phase signal and B-phase signal) are outputted starting from when the index signal (Z phase signal) are outputted up to the latest phase of the magnetic field, and a mode in which only the A-phase and B-phase pulse signals A and B are outputted. The rotational pulse signal (A-phase signal and B-phase signal) generated by the rotational pulse signal generator 17 in the absolute angle output mode is different from that in the other mode. The rotational pulse signals (A-phase signal and B-phase signal) in the mode (normal mode) which is not the absolute angle output mode are outputted as a pulse signal with a speed which corresponds to the change in the magnetic field detected by the corresponding magnetic sensors 3A, 3B. On the other hand, each of the rotational pulse signals (A-phase signal and B-phase signal) in the absolute angle output mode is outputted as a pulse signal with a speed considerably higher than the pulse signal outputted in the normal mode. Similarly, the index signal (Z-phase) in the absolute angle output mode is also a high-speed pulse signal.

The absolute angle output mode execution section 15 may execute an output operation of the absolute angle output mode, immediately after the corresponding magnetic sensors 3A, 3B are powered on as well as in response to a request signal from the phase difference detector 6 which receives the output of the magnetic sensors 3A, 3B. (F) of FIG. 9 shows as a way of example the waveform of such a request signal outputted from the phase difference detector 6. The magnetic sensors 3A, 3B may output a power ON signal immediately after they are powered on, and the power ON signal is inputted to the corresponding absolute angle output mode execution section 15.

The mode execution generator 16 may output a signal (ABS_mode signal) which indicates that the absolute angle output mode execution section 15 is executing the output operation of the absolute angle output mode. For example, the mode execution generator 16 may be configured as part of the absolute angle output mode execution section 15. (D) of FIG. 9 shows as a way of example the waveform of such an ABS_mode signal outputted from the mode execution generator 16.

Now the operation of the magnetic sensors 3A, 3B in detecting the phases of the corresponding magnetic encoders 2A, 2B and outputting the magnetic phase information to the phase difference detector 6 will be described with respect to two different circumstances: (i) when the rotational member is not in rotation ((A) to (F) of FIG. 9); and (ii) when the rotational member is in rotation ((A) to (F) of FIG. 10).

(i) When the Rotational Member is not in Rotation

When the angle information output circuit 20 in the phase detector circuits 13A, 13B of the corresponding magnetic sensors 3A, 3B receives from the phase difference detector 6 a request signal for absolute angle output such as the one shown in (F) of FIG. 9, the absolute angle output mode execution section 15, in response to the request, is activated, promoting the mode execution signal generator 16 to generate a mode execution signal (ABS_mode signal) such as the one shown in (D) of FIG. 9 which indicates that the absolute angle output mode execution section 15 is in the absolute angle output mode, while also promoting the rotational pulse signal generator 17 to generate rotational pulse signals (A-phase, B-phase, and Z-phase signals) such as shown in (A) to (C) of FIG. 9. As for the order in which the respective signals are generated, the ABS_mode signal of 1 is outputted first, and then the index signal (Z-phase signal) is outputted, which is followed by the outputting of the two rotational pulse signals (A-phase signal and B-phase signal). Note that, under this circumstance, the index signal (Z-phase signal) is outputted regardless of whether the magnetic sensors 3A, 3B are at zero degree phase or not.

The phase difference detector 6 which receives these signals during operation, upon receiving the index signal (Z-phase signal), resets to "0" the position counters 18A, 18B that serve to indicate corresponding absolute angle values. The position counters 18A, 18B will count the A-phase and B-phase signals outputted subsequent to the Z-phase signal in such a manner as shown in (E) of FIG. 9. The position counters 18A, 18B may count the rising edges and falling edges of the pulses forming the A-phase and B-phase signals (multiplication by four). Assuming that the absolute value of the latest phase of the magnetic field detected by the magnetic sensors 3A, 3B are Qn, the rotational pulse signal generator 17 will output the number of pulses in the form of A-phase and B-phase signals which will be counted Qn times by the corresponding position counters 18A, 18B.

When the rotational pulse signal generator 17 has outputted the number of pulses equal to a total of Qn number of counts in the form of A-phase and B-phase signals, which will be counted by the corresponding position counters 18A, 18B, an ABS_mode signal generated by the mode execution generator 16 turns into "0", thereby indicating the completion of the absolute angle output mode. When the absolute angle output mode is completed, the count value of the corresponding position counter 18A, 18B in the phase difference detector 6 will provide the absolute value Qn indicative of the latest phase of the magnetic field.

In this way, by counting A-phase and B-phase signals from the corresponding rotational pulse signal generator 17 during the absolute angle output mode (ABS_mode=1) and transmitting the absolute phase data Qn at the corresponding position counters 18A, 18B, phase information of the corresponding magnetic field can be successfully outputted in the form of an ABZ phase signal to the phase difference detector 6, effectively eliminating the need to establish a serial communication means.

In the above description, a request signal from the phase difference detector 6 for the absolute angle output mode is inputted to the angle information output circuit 20 in the phase detector circuits 13A, 13B in the corresponding magnetic sensors 3A, 3B, in order to put the absolute angle output mode execution section 15 in the absolute angle output mode. Optionally, the power ON of the corresponding magnetic sensors 3A, 3B may also, as part of initialization operation, put the absolute angle output mode execution section 15 in the absolute angle output mode. In the latter case, a power ON signal outputted by the corresponding magnetic sensors 3A, 3B serves as a timing signal for the absolute angle output mode, instead of the aforementioned request signal.

Similarly in this case, by the power ON of the magnetic sensors 3A, 3B, A-phase and B-phase signals having the number of pulses that corresponds to the latest phase of the magnetic field detected by the corresponding magnetic sensors 3A, 3B are outputted to the phase difference detector 6, so that the latest information on the phase of the magnetic field can be transmitted to the phase difference detector 6. When the phase difference detector 6 has been reset for some reason or when the phase difference detector 6 cannot properly receive the A-phase and B-phase signals in response to the power on of the magnetic sensors 3A, 3B, due to a considerable time required to activate the phase difference detector 6, a new request signal from the phase difference detector 6 for the outputting of information on the phase of the magnetic field is inputted to the angle information output circuit 20 of the phase detector circuits 13A, 13B in the magnetic sensors 3A, 3B, in order to newly promote the execution of the absolute angle output mode and allowing the transmission of the latest information on the phase of the magnetic field.

Note that, in the absolute angle output mode, the A-phase signal, B-phase signal and Z-phase signal are outputted in the form of pulse signals with maximized speeds. This makes it possible to minimize the time required to transmit the information on the phase of the magnetic field to the phase difference detector 6.

(ii) When the Rotational Member is in Rotation

Figure 10:
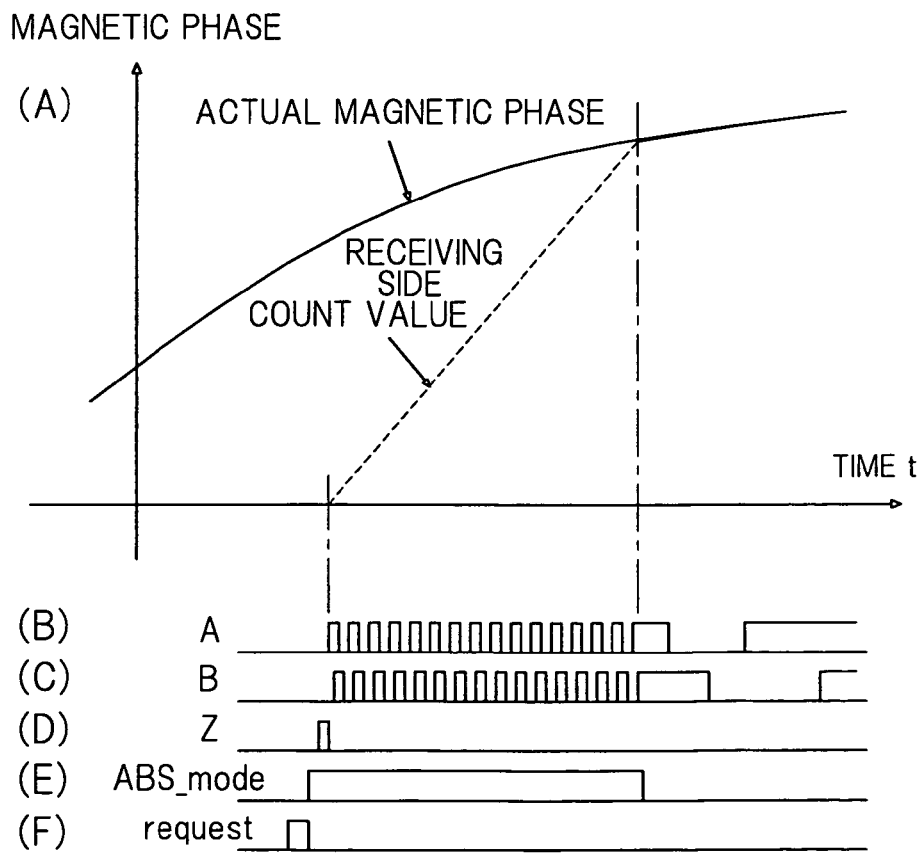
FIG. 10 is a diagram showing the output operation of an angle information output circuit of a given magnetic sensor in an absolute angle output mode, provided that a rotational member is in rotation.

In this case, too, when the angle information output circuit 20 in the phase detector circuits 13A, 13B of the magnetic sensors 3A, 3B receives from the phase difference detector 6 a request signal for absolute angle output such as the one shown in (F) of FIG. 10, the absolute angle output mode execution section 15, in response to the request, is activated, promoting the mode execution signal generator 16 to generate a mode execution signal (ABS_mode=1) such as shown in (E) of FIG. 10 which indicates that the absolute angle output mode execution section 15 is in the absolute angle output mode, while also promoting the rotational pulse signal generator 17 to generate rotational pulse signals (A-phase signal, B-phase signal and Z-phase signal) such as shown in (B) to (D) of FIG. 9.

The phase difference detector 6, upon receiving the Z-phase signal, resets the position counters 18A, 18B that serve to indicate corresponding absolute angle values. The position counters 18A, 18B will count the A-phase and B-phase signals outputted subsequent to the Z-phase signal. When the corresponding position counters 18A, 18B has finished counting pulse outputs of A-phase and B-phase signals up to the latest phase of the magnetic field in such a manner as shown in (A) of FIG. 10, the operation of the mode execution signal output mode is completed (ABS_mode=0). After that, rotational pulse signals (A-phase, B-phase and Z-phase signals) are outputted, which signals correspond to the change in phase of the magnetic field detected by the magnetic sensors 3A, 3B, when the rotational member rotates. By acquiring, based on the pulses counted this way, the phase of the magnetic field detected by the magnetic sensors 3A, 3B, the phase difference detector 6 can, even after the absolute angle output mode is completed (ABS_mode=0), continuously obtain the information of the latest phase of the magnetic field.

As described above, a rotation detecting device 1 according this embodiment enables the transmission of the information on a phase of the magnetic field detected by the corresponding magnetic sensors 3A, 3B to the phase difference detector 6 by the use of ABZ phase pulse signals in a fashion similar to conventional incremental encoders, without the need to implement additional specialized hardware. Accordingly, a high speed transmission while being robust against noise can be accomplished and the number of wirings used can be minimized. Also, since there is no overhead of the communication protocol, the rotation information can be transmitted in a minimized length of time.

Furthermore, the mode execution signal generator 16, that outputs a signal (ABS_mode) indicating whether or not the absolute angle output mode execution section 15 of the angle information output circuit 20 of the phase detector circuit 13A, 13B of the magnetic sensor 3A, 3B is in the absolute angle output mode, allows the determination of for what purpose the rotational pulse signals (A-phase, B-phase, and Z-phase signals) from the magnetic sensors 3A, 3B are intended to serve, by simply implementing a signal line for the indication of the absolute angle output mode. This enables the transmission of the information on the phase of the magnetic field without disturbing other control systems.

Furthermore, the state of the phase difference detector 6 can influence the output operation of the absolute angle output mode execution section 15 to output the information on the phase of the magnetic field, by sending a request signal from the phase difference detector 6 to the magnetic sensors 3A, 3B. In this way, adequate time is provided for the phase difference detector 6 to perform its calculation of the phase difference.

The angle information output circuit 10 such as shown in FIG. 7 may similarly output an ABZ phase signal including A-phase and B-phase pulse signals A and B, which are displaced 90° in phase from each other, and a Z-phase pulse signal Z indicative of start position.

Figure 11:
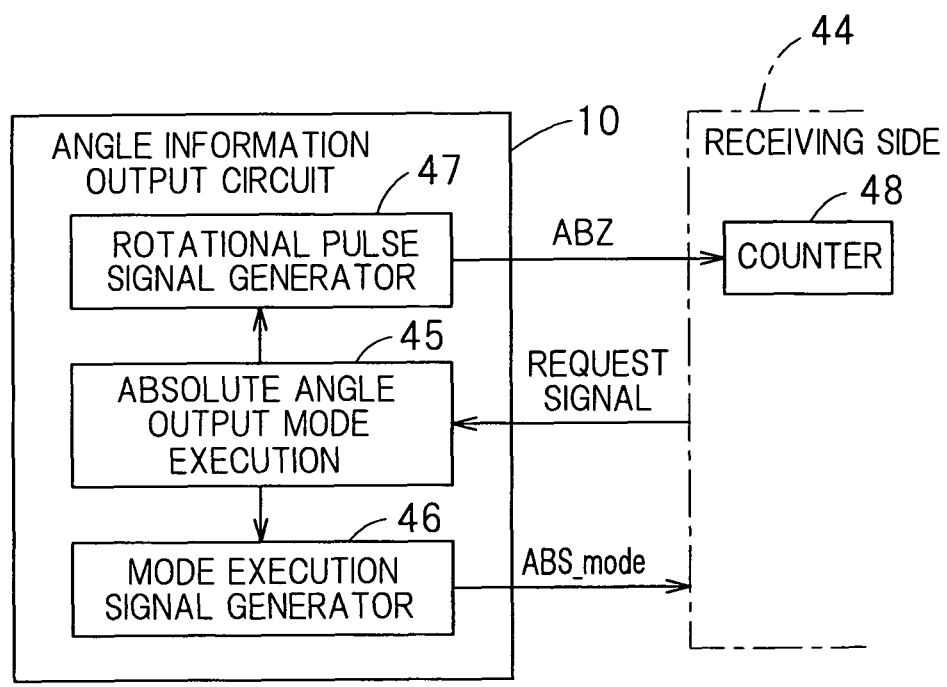
FIG. 11 is a block diagram showing a construction example of an angle information output circuit in a rotation detecting device encompassed in the present invention.

In this case, the angle information output circuit 10 may be configured such that when it receives from a receiver circuit 44 a request signal for absolute angle output in such a manner as shown in FIG. 11, an absolute angle output mode execution section 45 of the angle information output circuit 10 is activated. The absolute angle output mode execution section 45 promotes a mode execution signal output generator 46 to generate a mode execution signal (ABS_mode=1) which indicates that the absolute angle output mode execution section 45 of the angle information output circuit 10 is in the absolute angle output mode, while also promoting a rotational pulse signal generator 47 of the angle information output circuit 10 to generate A-phase signal, B-phase signal and Z-phase signals.

The receiver circuit 44, upon receiving the Z-phase signal, may reset to "0" a position counter 48 that serves to indicate corresponding absolute angle values. The position counter 48 then count the A-phase and B-phase signals outputted subsequent to the Z-phase signal. When the position counter 48 has finished counting pulse outputs of A-phase and B-phase signals up to the latest phase of the magnetic field, the operation of the mode execution signal output mode is completed (ABS_mode=0). After that, the angle calculator 7 outputs rotational pulse signals (A-phase, B-phase and Z-phase signals) which correspond to the change in the phase of the magnetic field detected as the rotational member 4 (FIG. 1) rotates. By counting these pulses for absolute angle, the receiver circuit 44 can, even after the absolute angle output mode is completed (ABS_mode=0), continuously obtain the information of the actual phase of the magnetic field.

By outputting rotational pulse signals such as a ABZ phase signal from the angle information output circuit 10 and by outputting information on the absolute angle during the absolute angle output mode, there is no need to provide an additional interface for outputting the absolute angle and, therefore, the circuit construction of the rotation detecting device 1 and the circuit construction on the side of a machine where the rotation detecting device 1 is mounted can be simplified.

The magnetic sensors 3A, 3B and a signal processor circuit that includes the angle information output circuit 10 such as the one shown in FIG. 7 may be integrated in a sensor module 11 as shown in the example of FIG. 2. Also, the sensor module 11 may be integrated into a single semiconductor chip. Such arrangements will provide advantages, for example, reduction in the number of parts, more precise positioning of the magnetic sensors 3A, 3B, reduction in manufacturing cost, reduction in assembling cost, detection with higher precision brought by reduction in signal noise, etc., and will also provide a compact, inexpensive rotation detecting device 1.

In this case, a single sensor module 11 confronts the two magnetic encoders 2A, 2B, thereby requiring the two magnetic encoders 2A, 2B to be positioned adjacent each other.

As is mentioned above, a rotation detecting device 1 may include a plurality of magnetic encoders 2A, 2B arranged in a coaxial ring arrangement and having respective number of magnetic poles different from each other, and a plurality of magnetic sensors 3A, 3B for detecting respective magnetic fields of those magnetic encoders 2A, 2B, each having a function of detecting information on the position of the magnetic encoders 2A, 2B within each of the magnetic poles. The magnetic sensors 3A, 3B may each include sensor elements, and a phase detector 13A, 13B for determining the phase of the corresponding sensor element in reference to a magnetic field signal detected thereby and outputting an ABZ phase signal. The rotation detecting device may further include a phase difference detector 6 for determining a phase difference of the magnetic field signals in reference to outputs from the phase detectors 13A, 13B, and an angle calculator 7 for calculating an absolute angle of the magnetic encoder 2A, 2B based on the phase difference so detected. In this way, a rotation detecting device robust against noise and capable of detecting the absolute angle with high precision even during a high speed rotation can be provided.

The characteristics in the typical examples of this embodiment are summarized below:

The detected phase signals are transmitted to the phase difference detector 6 as shown in FIG. 7, using pulse signals of ABZ phase signals in such a manner as shown in FIG. 8.

The detected phase of the magnetic field is processed in the form of data of 0 to 360 degree phase and is transmitted in the form of a series of pulse outputs in such a manner as shown in the chart in FIG. 10. This procedure does not involve the transmission of analog signals and therefore is much less subject to noise. Also, after such phase data are outputted in accordance with the absolute angle output mode, which may occur as soon as the power is switched on, rotational pulses corresponding to the rotation of the rotational member are transmitted to and counted by the counters 18A, 18B so as to track the latest phase. Therefore, a response is rapid, and what is more, the detected absolute angle can be calculated with higher precision. Also, compared to data transmission via a serial communication method, the rotational information can be transmitted with much less or no delay. Therefore, the response during high-speed rotation is further improved.

A phase signal (which is equivalent to rotational pulses except during the absolute angle output mode), such as the pulse signal shown in the upper portion of FIG. 7, which is detected by one of the magnetic sensors 3A (or 3B) as rotational signals, thus there being much less or no internal delay caused by angle calculation. In this way, an angle sensor compatible for high speed rotation can be provided.

Accordingly, the following advantages are provided:

The transmission of the phase signals are much less subject to noise, as it does not involve the use of analog signals.

The phases of the magnetic field detected by the sensors 3A, 3B are outputted in the absolute angle output mode as soon as the power is switched on, thereby eliminating the need to provide specialized wirings for the transmission of the data on the phases of the magnetic field.

Once the absolute angle (phase) data have been outputted, ABZ phase signals which track the real-time rotations are outputted, thereby allowing the high speed transmission of the detected phase signals, minimizing the detection delay, and enabling absolute angle detection with higher precision.

Although in the above embodiment the two magnetic encoders 2A, 2B have been described for illustration purposes, the configuration with two magnetic encoders is not limiting to the invention. In other words, three or more encoders having respective number of magnetic pole pairs different from each other may be used in combination to allow a wider range of absolute angles to be detected. Assuming that rotation detecting device 1 is used to detect the rotation of a motor having Pn magnetic pole pairs, by setting the number of the magnetic pole pairs of the magnetic encoders to be P and P+Pn, respectively, rotation detecting device 1 will enable detection of the electric angle of the motor, this being advantageous for rotation control of a motor.

The exemplary configuration shown in FIG. 7 assumes that each of the magnetic sensors 3A, 3B includes a phase detector 13A or 13B that detects the phase within a magnetic pole and that each of the magnetic sensors 3A, 3B can provide, on its own, a position information output using ABZ phase signals. However, the magnetic sensors 3A, 3B may not have a function of outputting a Z-phase signal for each set of the magnetic poles, while having a multiplication function of multiplying the phase within a single magnetic pole.

In such case, for instance, the analog signals of the two different phases (sin ϕ, cos ϕ) and etc., detected by the two sensor elements 3A1, 3A2 may be used to determine the phase within a magnetic pole and be recorded. Then, the position counters 18A, 18B may be activated to integrate the outputted A-phase and B-phase signals to continuously detect angles.

However, the position counters 18A, 18B may cause malfunctions (miscount), for example, due to noise. In this case, since there is no chance to correct the errors, retention of detection errors may occur.

For this purpose, a rotation detecting device 1 according to a second preferred embodiment may include a plurality of magnetic encoders having different numbers of magnetic poles, at least one of which includes a plurality of magnetic tracks with a portion of the magnetic tracks formed with a phase offset pattern for generating an index signal. In particular, as shown in the example of three-track construction of FIG. 12B with two magnetic encoders 2A, 2B arranged coaxially and having respective number of magnetic poles different from each other, the magnetic encoder 2A which is positioned radially outwards of the magnetic encoder 2B may include two magnetic encoder tracks 2Am, 2Ai. In the illustrated example, the magnetic encoders 2A, 2B are of axial type having magnetic members in the form of rings with each of the magnetic pole pairs on an axially oriented end face thereof.

Figure 12A:
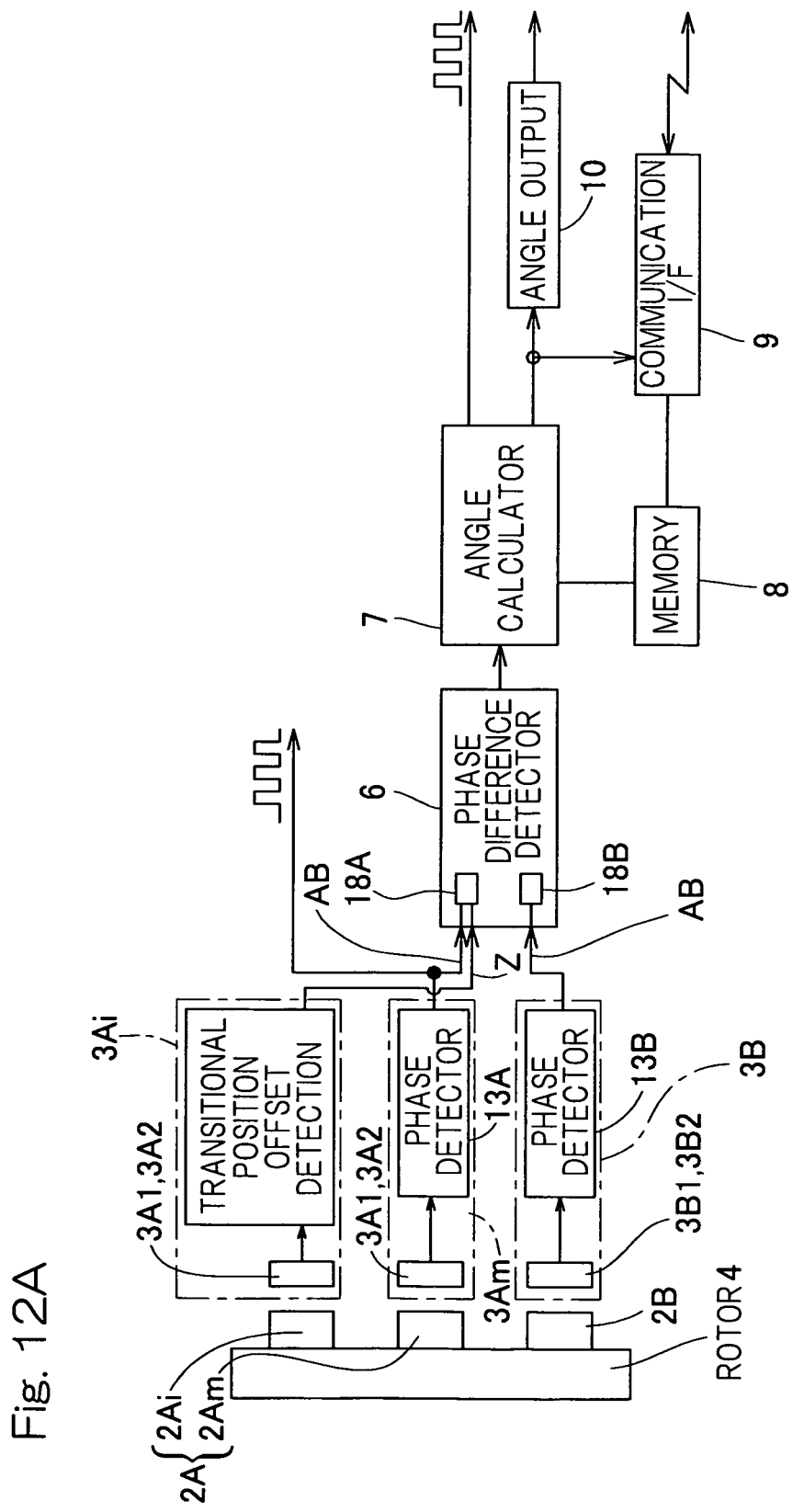
FIG. 12A is a block diagram showing a construction example of a rotation detecting device according to a second embodiment of the present invention.
Figure 12B:
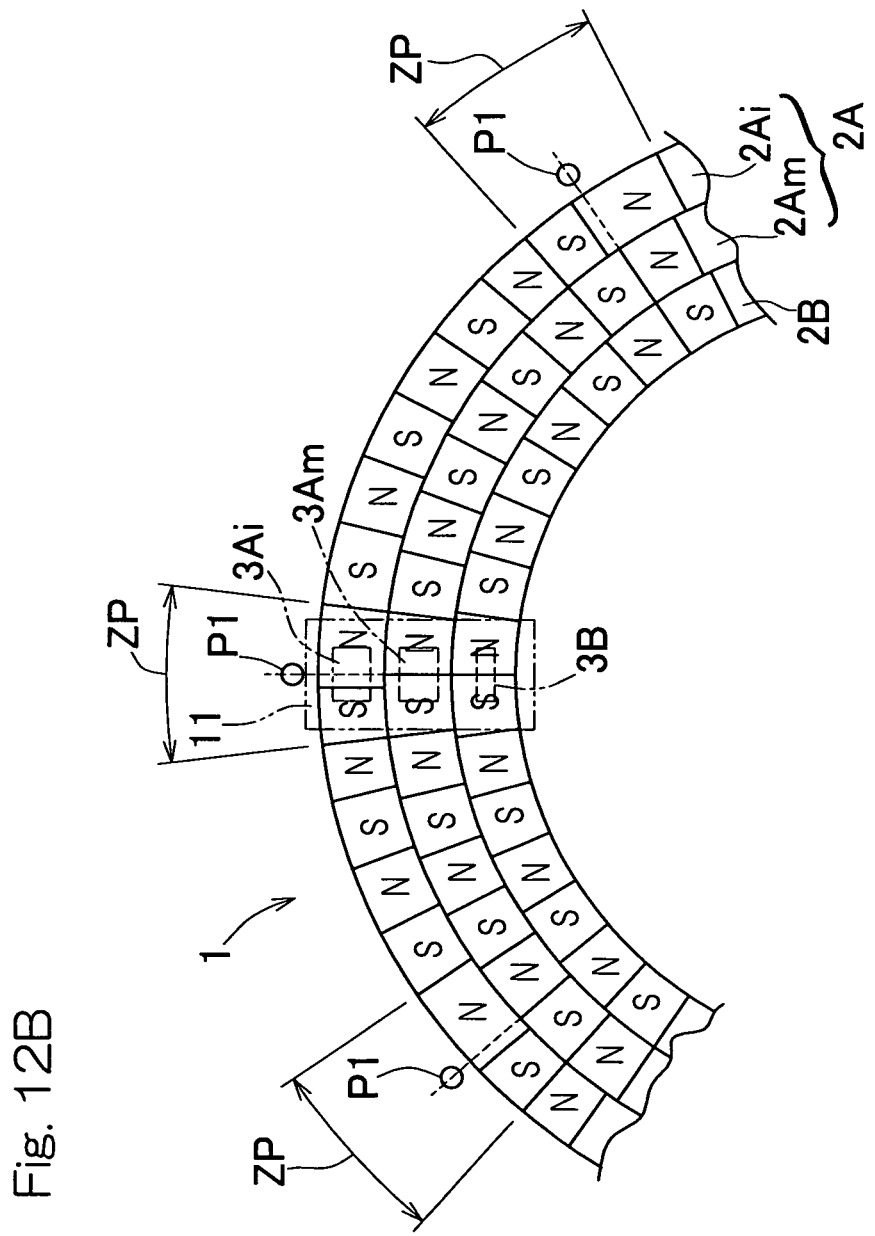
FIG. 12B is a front elevational view showing magnetic encoders in the rotation detecting device of FIG. 12A.

In the example as illustrated in FIG. 12B, the two magnetic tracks 2Am, 2Ai of the magnetic encoder 2A arranged radially outwards of the magnetic encoder 2B may be configured to have the same number of magnetic poles. However, the magnetic track 2Ai radially outwards of the magnetic track 2Am may include magnetic poles, some of which have widths different from those of magnetic poles of the magnetic track 2Am for phase detection, thus forming an index track. More specifically, index points P1, each of which generates an index signal, may be defined at substantially equal intervals in a circumferential direction. At the index points P1, transitions from S pole to N pole in the circumferential direction on the magnetic track 2Ai may be offset in a single direction (i.e., towards the left-hand side on the illustration) with respect to the transitions from S pole to N pole on the magnetic track 2Am. For example, n number of the index points P1 may be formed at substantially equal intervals therebetween, the n being equal to the difference in number of the magnetic pole pairs between the magnetic encoders 2A, 2B.

The patterns ZP in portions of the magnetic track 2Ai where change in the direction of transition of the magnetic poles of the magnetic track 2Ai with respect to the magnetic poles of the magnetic track 2Am for phase detection occurs may be "phase offset patterns" each of which generates an index signal.

Magnetic sensors 3Am, 3Ai may confront the magnetic tracks 2Am, 2Ai with small gaps between them. Of the magnetic sensors 3Am, 3Ai, the magnetic sensor 3Ai may detect the offsets in the transitions and outputs index signals. The index points P1 may be formed at n number of substantially equal intervals therebetween, and n number of the index signals per rotation of one magnetic encoder may be outputted.

In FIG. 12A, the detected index signals are outputted from the magnetic sensor 3Ai as Z-phase signals. The phase difference detector 6 may, in response to such index signals, reset to "0" the position counter 18A. By resetting the position counter 18A that way, the miscounts by the position counter 18A, for example, due to noise will not have any harmful effects. This will prevent the retention of errors.

The index points P1 may be formed at substantially equal intervals therebetween as mentioned above, or may be formed for all of the magnetic pole pairs of the magnetic tracks 2Am, 2Ai. Such a configuration with the index points P1 formed for all of the magnetic pole pairs will be equivalent to a configuration that includes one or more magnetic sensors each capable of detecting the phase within a magnetic pole and outputting an ABZ phase signal.

Each of a plurality of magnetic encoders 2A, 2B may be formed with phase offset patterns for generation of index signals. Magnetic encoders 2A, 2B having respective number of magnetic poles different from each other may both be able to provide index signals, so that the phase difference detector 6 can, upon receiving the index signals from both of the magnetic encoders 2A, 2B, reset to "0" both of the position counters 18A, 18B that serve to count corresponding A-phase and B-phase signals. This enables resetting of miscounts by the position counters 18A, 18B, thus further improving the reliability of detected values. In this case, again, the index points P1 may be formed at substantially equal intervals therebetween or may be formed for all of the magnetic pole pairs.

Some arrangements that use signals from the magnetic encoders 2A, 2B having respective number of magnetic poles different from each other for the calculation of an absolute angle may cause a problematic time delay in the calculation of an absolute angle during high speed rotations of a rotational member. In this case, the outputting of index signals at certain fixed location(s) could make it possible to use such index signals for angle calculations, without the need to wait for an absolute angle to be calculated. This may improve responses during high speed rotations.

The phase difference detector 6 may be configured to set the position counters 18A, 18B to predefined values, when it receives the index signals.

Figure 13:
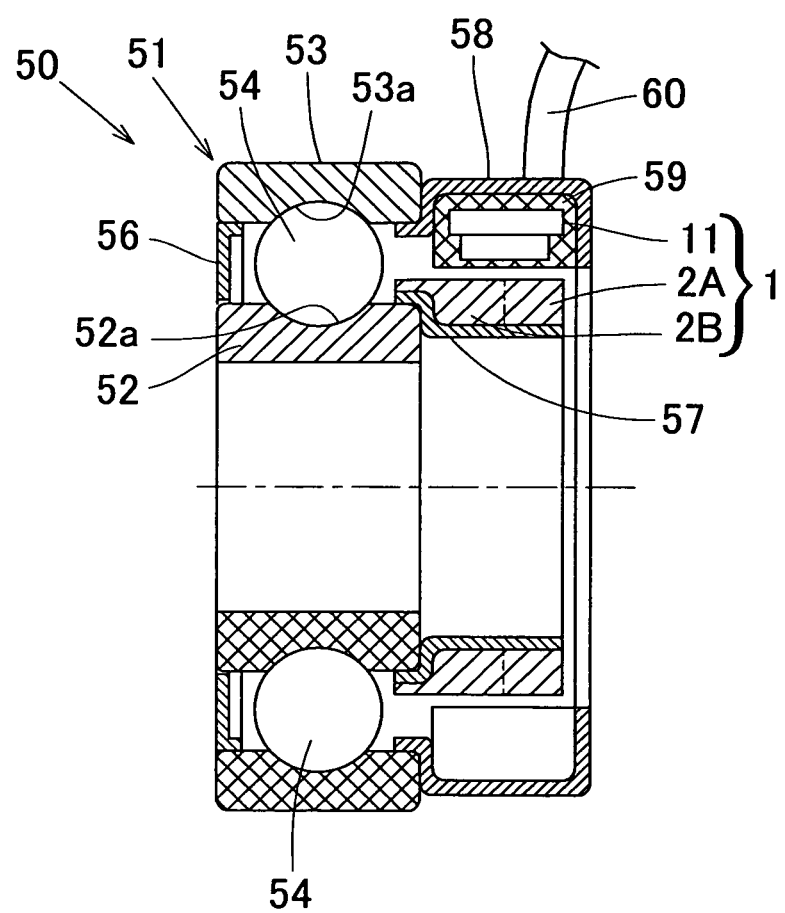
FIG. 13 is a sectional view showing an embodiment of a bearing assembly which includes a bearing having mounted thereto a rotation detecting device encompassed in the present invention.

FIG. 13 is a sectional view showing an embodiment of a bearing assembly having a rotation detecting device 1 according to the first or second preferred embodiment mounted thereto. Such a bearing assembly 50 may include a bearing 51 including an inner member 52 which serves as a rotational raceway member, an outer member 53 which serves as a stationary raceway member, a plurality of rolling elements 54 interposed between the inner member 52 and the outer member 53, and a rotation detecting device 1 provided at an end of the bearing 51. The bearing 51 may form a deep groove bearing and includes the inner member 52 having an outer diametric surface formed with a raceway surface 52a for the rolling elements 54 and the outer member 53 having an inner diametric surface formed with a raceway surface 53a for the rolling elements 54. The inner member 52 and the outer member 53 may provide a bearing space delimited therebetween that includes ends, one end of which is provided with the rotation detecting device 1 as mentioned above and the other end of which is enclosed by a seal 56.

The rotation detecting device 1 may include two magnetic encoders 2A, 2B arranged axially with respect to each other that are provided on an outer diametric surface of a core 57 press-fitted to an outer diametric surface of the inner member 52 at an end of the inner member 52. The rotation detecting device 1 may further include a sensor module 11 in which two magnetic sensors 3A, 3B and other signal processors are all integrated in such a manner as shown and described in connection with FIG. 2. The rotation detecting device 1 may include a molded resin 59 which contains the sensor module 11 therein as well as a substantially ring-shaped sensor housing 58 made of metal(s) which holds the molded resin 59 fitted therein and which is mounted to an inner diametric surface of the outer member 53 at one end of the outer member 53 through the sensor housing 58. This way, the magnetic sensors 3A, 3B are positioned so as to radially confront the corresponding magnetic encoders 2A, 2B. A lead 60 may be coupled to the sensor module 11 and may penetrate the sensor housing 58 to the external environment, so that the lead 60 can facilitate the communication or power supply between the sensor module 11 and external circuits.

Such a bearing assembly 50 including a bearing 51 with rotation detecting device 1 mounted thereto allows reduction in the number of parts used in an object to which the bearing assembly may be applied, reduction in the number of assembling steps, and reduction in size.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1: Rotation detecting device
2A, 2B: Magnetic encoder
3A, 3B: Magnetic sensor

3A1, 3A2, 3B1, 3B2: Sensor element
3AA, 3AB: Line sensor
6: Phase difference detector
7: Angle calculator
10: Angle information output circuit
13A, 13B: Phase detector
50: Bearing assembly with rotation detecting device
51 Bearing

What is claimed is:

1. A rotation detecting device comprising:
a plurality of magnetic encoders arranged in a coaxial ring arrangement and having respective number of magnetic poles different from each other;
a plurality of magnetic sensors for detecting respective magnetic fields of those magnetic encoders, each of the magnetic sensors having a function of detecting information on the position of the magnetic encoders within each of the magnetic poles, each of the magnetic sensors includes
a plurality of sensor elements arranged at respective positions displaced from each other within the pitch of the neighboring magnetic poles, each of the sensor elements is configured to obtain two phase signal outputs representative of sine and cosine curves and to accomplish detection of the position within the magnetic poles by interpolation between the two phase signal outputs, and
a phase detector for determining the phase of the magnetic field signals in reference to the magnetic field signals detected by the sensor elements and outputting an ABZ phase signal including A-phase and B-phase pulse signals A and B, which are displaced 90° in phase from each other, and a Z-phase pulse signal Z indicative of start position;
a phase difference detector for determining a phase difference of the magnetic field signals in reference to an output from the phase detectors; and
an angle calculator for calculating the absolute angle of the magnetic encoders based on the phase difference so detected.

2. The rotation detecting device as claimed in claim 1, wherein at least one of the plurality of magnetic encoders having different numbers of magnetic poles includes a plurality of magnetic tracks, a portion of the magnetic tracks being formed with a phase offset pattern generating an index signal.

3. The rotation detecting device as claimed in claim 2, wherein n number of the phase offset patterns generating the index signal are formed at substantially equal intervals therebetween so as to output n (n is a natural number) number of Z-phase signals per rotation of the one magnetic encoder, n being a natural integer equal to the difference in number of the magnetic pole pairs between the one magnetic encoder and another one of the magnetic encoders.

4. The rotation detecting device as claimed in claim 2, wherein each one of magnetic pole pairs of the plurality of magnetic tracks is formed with the phase offset pattern generating the index signal so as to output a Z-phase signal for each of the magnetic pole pairs.

5. The rotation detecting device as claimed in claim 1, wherein the plural magnetic sensors are surface mounted with each magnetic sensor packaged individually and connected with the phase difference detector through wirings.

6. The rotation detecting device as claimed in claim 1, wherein the phase detector comprises an absolute angle output mode execution section capable of providing an output by selecting one of an absolute angle output mode, in which the phase of the magnetic field signal is outputted as the absolute angle, and a mode in which only the A-phase and B-phase pulse signals A and B are outputted.

7. The rotation detecting device as claimed in claim 1, further comprising:
an ABZ phase signal output section for outputting at least one set of signals out of the ABZ phase signals outputted by a plurality of the phase difference detectors, to the outside of the rotation detecting device.

8. The rotation detecting device as claimed in claim 1, wherein the number of the plural sensor elements is two and are arranged at respective positions displaced 90° from each other in terms of the pitch of the neighboring magnetic poles.

9. The rotation detecting device as claimed in claim 1, wherein the magnetic sensor comprises a line sensor, in which sensor elements are lined up along a direction, in which the magnetic poles of the magnetic encoder are arranged, and is capable of detecting the position within the magnetic poles by generating two phase signal outputs representative of sine and cosine curves through calculation and by interpolation between the two phase signal outputs.

10. The rotation detecting device as claimed in claim 1, further comprising:
an angle information output section for outputting the absolute angle information, calculated by the angle calculator, as the ABZ phase signal.

11. The rotation detecting device as claimed in claim 1, wherein each of the magnetic encoders has the magnetic poles on an outer peripheral surface thereof and the sensor elements of the corresponding magnetic sensor confront in a radial direction relative to the magnetic encoder.

12. The rotation detecting device as claimed in claim 1, wherein each of the magnetic encoders has the magnetic poles on an axially oriented surface thereof and the sensor elements of the corresponding magnetic sensor confront in an axial direction relative to the magnetic encoder.

13. A bearing assembly having the rotation detecting device as claimed in claim 1.

* * * * *